No. 728,002. PATENTED MAY 12, 1903.
E. PERCEVAL.
FASTENING DEVICE FOR PNEUMATIC TIRE JOINTS.
APPLICATION FILED JULY 26, 1901.
NO MODEL.
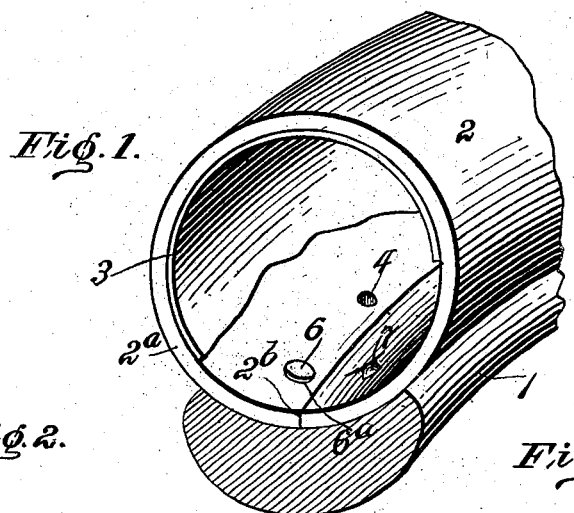
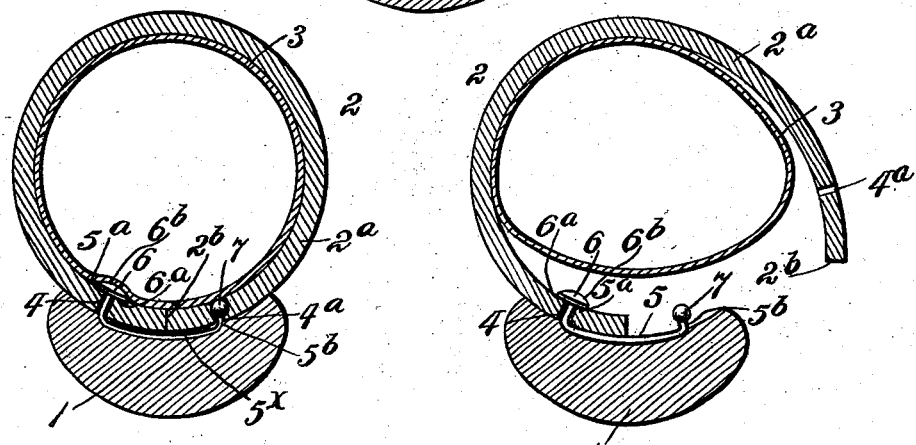
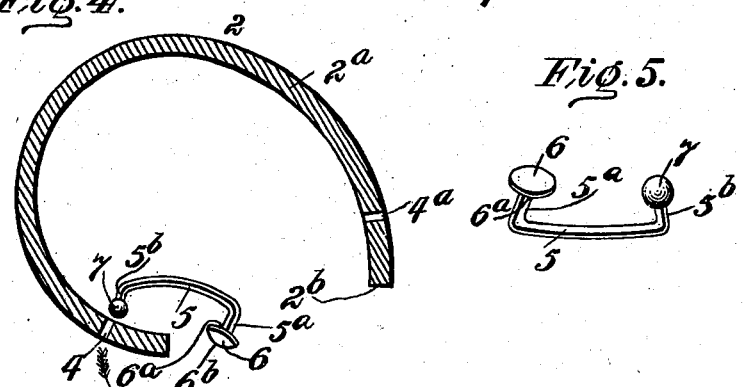
WITNESSES:
Guy V. Worthington
Lee B. Kemon
INVENTOR
E. Perceval
BY
Fred G. Dieterich
ATTORNEY No. 728,002. Patented May 12, 1903.

UNITED STATES PATENT OFFICE.

ECHLIN PERCEVAL, OF VANCOUVER, CANADA.

FASTENING DEVICE FOR PNEUMATIC-TIRE JOINTS.

SPECIFICATION forming part of Letters Patent No. 728,002, dated May 12, 1903.

Application filed July 26, 1901. Serial No. 69,864. (No model.)

*To all whom it may concern:*

Be it known that I, ECHLIN PERCEVAL, residing at Vancouver, in the Province of British Columbia and Dominion of Canada, have invented new and useful Improvements in Fastening Devices for Pneumatic-Tire Joints, of which the following is a specification.

My invention relates to means for fastening together the joints of the outer tube of a double-tube tire, and it primarily seeks to provide a simple, cheap, and easily-operated device which may be applied to the ordinary type of double-tube tire.

A further object of my invention is to provide a device of this character which will quickly and effectively fasten the opening of the outer tube of a double-tube tire without the use of lacing-cords and the like.

This invention therefore consists of the simple and effective device which will hereinafter be fully described and then particularly pointed out in the appended claims, reference being had to the accompanying drawings, in which—

Figure 1 is a perspective view of a portion of a bicycle-tire with my invention applied thereto. Fig. 2 is a cross-section thereof. Fig. 3 is a similar view showing the tire open for the withdrawal of the inner tube. Fig. 4 is a detail view showing the manner of initially applying the fastener to the tire, and Fig. 5 is a detail perspective view of the fastener detached.

Referring to the drawings, in which like numerals indicate like parts in all figures, 1 designates the rim of the bicycle, upon which is mounted the rubber tire 2, of the usual double-tube type, having an outer tube $2^a$, open, as at $2^b$, and an inner tube 3, as will be clearly understood by reference to Figs. 1, 2, and 3 of the drawings. The outer tube $2^a$ is of greater thickness than the inner tube 3, as shown, and is provided with the usual lacing-apertures 4 and $4^a$. (See Figs. 1, 2, and 3.)

The fastener device consists, essentially, of a flat strip 5, preferably formed of a non-corrosive metal or alloy. This strip 5 has upturned portions $5^a$ $5^b$, at the ends of which are formed the flat button-shaped member 6 and the ball-shaped member 7 for a purpose which will presently appear. The member 6 is formed integrally with the upturned portion $5^a$ of the member 5, which upturned portion $5^a$ is of a slightly less length than the thickness of the tire, whereby the device when applied to a tire, as shown in Figs. 1, 2, and 3, will lie with its flat portion 5 in close contact with the under side of the tire, as shown at $5^\times$ in Fig. 2. The upturned portion $5^b$ is of a less length than the portion $5^a$, whereby when the ball member 7 is inserted in the aperture $4^a$ it will not project entirely within the tire, but remain embedded in the rubber.

By reason of the short upturned portion $5^b$ of the member 5 and the peculiar shape of the ball member 7 the elastic force of the tire surrounding the ball 7 will tend to force the same into the interior of the tire, and thereby hold the strip 5 of the fastening member tightly against the tire, it being understood that the diameter of the ball and the button-shaped members $5^a$ and $5^b$ are greater than the diameters of the apertures 4 and $4^a$.

The button-shaped member 6 is larger in diameter than the ball member 7 to prevent its passage through the aperture 4, as will be clearly seen by reference to the drawings. Furthermore, the button-shaped member is flattened, as at $6^a$, so as to lie snugly against the inside of the tire and not project far into the tire, while the upper portion is slightly curved, as at $6^b$.

By arranging the button and ball members as shown and described it will be readily seen they offer little or no obstruction to the inner tube of the tire, and by reason of the member 5 being made thin, flat, and curved to fit the tire, as shown, no special form of rim is necessary for the tire equipped with my fastener.

In Fig. 4 I have shown the manner of applying my improved fastener to a tire, from which it will be seen the ball end of the fastener is first inserted from the inside of the tire into the aperture 4. The portion 5 is then pulled through until the button member comes in contact with the tire. The tire is then ready to be applied to the rim of the wheel.

From the foregoing, taken in connection with the accompanying drawings, it is thought the advantages and operation of my fastening means will be readily understood.

I am aware that fastening devices of a similar nature have heretofore been employed to fasten together the outer tubes of pneumatic tires; but so far as I am aware the tires employing such devices were of special construction and required a special form or shape of aperture into which the devices were adapted to fasten.

I do not, therefore, claim, broadly, a fastener device of this type; but

What I do claim, and desire to secure by Letters Patent, is—

1. A fastener of the class described; comprising a flat shank member having upturned portions, a flattened button at one end and a ball at the other end, all being arranged substantially as shown and for the purposes described.

2. In a fastener as described; a shank having upturned ends, and a ball integral with one end, substantially as shown and described.

In testimony whereof I have signed my name to this specification in the presence of two subscribing witnesses.

ECHLIN PERCEVAL.

Witnesses:
W. H. JOHNSON,
CHAS. S. ARNOLD.